BINARY COUNTERS

Filed June 3, 1955

INVENTOR
HERMAN EPSTEIN
BY
Lawrence R. Brown
ATTORNEY

2,795,776

BINARY COUNTERS

Herman Epstein, West Chester, Pa., assignor to Burroughs Corporation, Detroit, Mich., a corporation of Michigan Application June 3, 1955, Serial No. 513,090

5 Claims. (Cl. 340—174)

This invention relates generally to magnetic bistable devices and more specifically to magnetic binary counters.

There are in the prior art many types of flip-flop circuits including electronic tube, binary magnetic element, and electromechanical which may be used as binary counters by proper circuit connections. The electronic tube type of binary counter has a high speed of operation but the characteristics of the electronic tubes used therein change with use and age. The electromechanical or relay type of binary counter deteriorates with use and age and is relatively slow in operation. The magnetic element type of binary counter has a fairly high speed of operation and its operating characteristics do not change appreciably with use and age. However, known magnetic type binary counters generally utilize two or more magnetic circuit elements. Thus, a magnetic type binary counter utilizing only one magnetic circuit element is proposed in accordance with the present invention.

Therefore, in accordance with one embodiment of the invention, there is provided a magnetic flip-flop circuit utilizing a single storage element and having a characteristic curve illustrating operation in a negative resistance intermediate two positive resistance regions, wherein opposite stable operating points are produced at each of the positive resistance regions. As in prior art flip-flop circuits, separate input triggering means may be provided to cause said flip-flop circuit to assume either the first or second of its two stable conditions. The flip-flop circuit employs a dynamic characteristic even though a magnetic storage element is used, so that there will always be a single available representative of the stable state, and not only upon the switching of the magnetic element from one state to another. By means of a gating circuit responsive to the storage condition which connects a further input circuit alternately to the separate input triggering means, the gating circuit each is made responsive to a first state of the flip-flop circuit to be in a conductive condition and responsive to the second state of said flip-flop circuit to be in a nonconductive condition. Thus the flip-flop circuit has a preferred state opposite to the resident state which is caused to be assumed by application of an input pulse through the gating circuit and the switching from the resident state to the opposite state may thus be accomplished by a single pulse source thereby satisfying the requirements of a binary counter.

In accordance with other features of the invention, the flip-flop circuit comprises an alternating current source which feeds serially through the primary winding of a magnetic core and a rectifier circuit. The rectified alternating current is then fed back and caused to flow through a center tapped secondary winding of the magnetic core in such a manner that the resultant magnetic flux created in the magnetic core thereby is unilateral. Due to the feedback arrangement, the flip-flop circuit is made unstable except in the two conditions where the current through the primary winding and the current through the secondary winding satisfy the circuit parameters to establish the positive resistance characteristic.

It is a general object of the invention to provide improved magnetic flip-flop circuits.

Another object of the invention is to provide a magnetic binary counter circuit.

A further object of the invention is to provide a bistable magnetic flip-flop circuit for producing a steady output signal representative of the storage state of the magnetic element throughout the duration of the storage state.

These and other objects and features of the invention will become more fully understood from the following detailed description when read in conjunction with the drawings in which.

Figure 1:
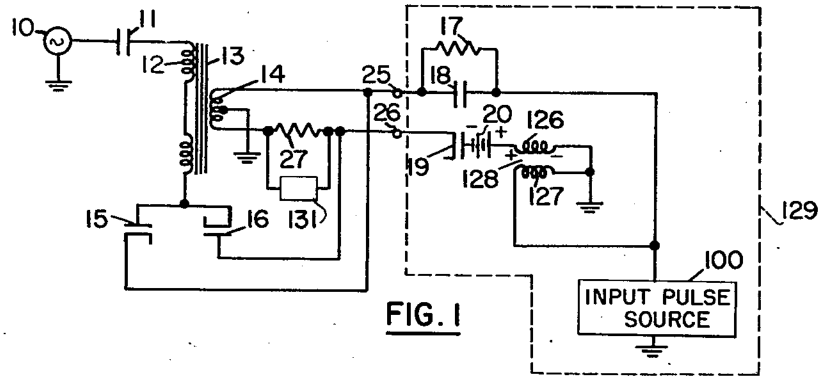
Figure 1 is a schematic sketch of one magnetic binary counter circuit embodying the invention.

Referring now to Figure 1, alternating current source 10 is connected to a first plate of capacitor 11. The other plate of capacitor 11 is connected to a first terminal of primary winding 12 which is wound on magnetic core 13. The diode 15 has its anode connected to the second terminal of winding 12 and its cathode connected to the terminal 25 of secondary winding 14. The diode 16 or other asymmetrically conducting device has its cathode connected to the second terminal of the primary winding 12 and its anode connected to the terminal 26 coupled with the secondary winding 14. The series combination of the tapped secondary winding 14 on magnetic core 13 and resistance 27 is connected between terminals 25 and 26. An input pulse source 100 for producing trigger pulses to be counted in binary fashion is connected to terminal 25 through the parallel combination of resistance 17 and capacitance 18 which constitutes a delay circuit. Input pulse source 100 is connected also to terminal 26 through the primary 127 and secondary 126 of transformer 128, voltage source 20, and diode 19. The portion of the circuit included in the dotted line box represents the circuitry which, in cooperation with the flip-flop circuit outside the box 129 creates a binary counter. An output load circuit 131 may be connected to the binary counter in shunt with the resistor 27.

In the embodiment of the invention shown in Figure 1, the following circuit values may be used for counting in the 50 kilocycle frequency range where the input signal source is a higher frequency than the counting range. Capacitor 11, 0.001 microfarad; winding 12, 100 turns; winding 14, 400 turns; resistance 27, 1000 ohms; resistance 17, 100 ohms, and voltage source 20, 9 volts. The input pulse source 100 generates 4 volt trigger pulses, and the transformer 128 has a turns ratio of primary 127 to secondary 126 of 4 to 7. The magnetic core 13 is of a saturable bistable magnetic material having a substantially rectangular hysteresis loop such as is well known in the art.

Input pulses from pulse source 100 are about 4 volts in magnitude, so that there will be a potential of about 7 volts generated in the secondary winding 126 of transformer 128. The polarity of this induced 7 volts, as is shown in Figure 1, is such that the positive pole is adjacent to the diode 19. The purpose of the transformer 128 is to produce a voltage of a magnitude which when combined with the negative nine volt source and the potential drop across the resistance 27 when the flip-flop circuit is in its high current state, will cause a current to flow through the diode 19, the resistor 27, the lower portion of winding 14 to ground. Such a current will flow inasmuch as the potential of point 26 will be at about a negative six volts and the combined voltage across secondary winding 126 and potential source 20 is a negative 2 volts. When the flip-flop circuit is in its low current state, no current will flow through the diode 19 from secondary winding 126 since the potential of point 26 is substantially zero under these conditions and the combined voltage across secondary winding 126 and potential source 20 is a negative 2 volts. The use of the transformer 128 permits the direct current grounding of one terminal of the potential source 20. It is to be noted that the alternating current flowing through the winding 12 is rectified so that the current flowing through the winding 14 produces a unilateral magnetic flux in the magnetic core 13.

Figures 2, 3:
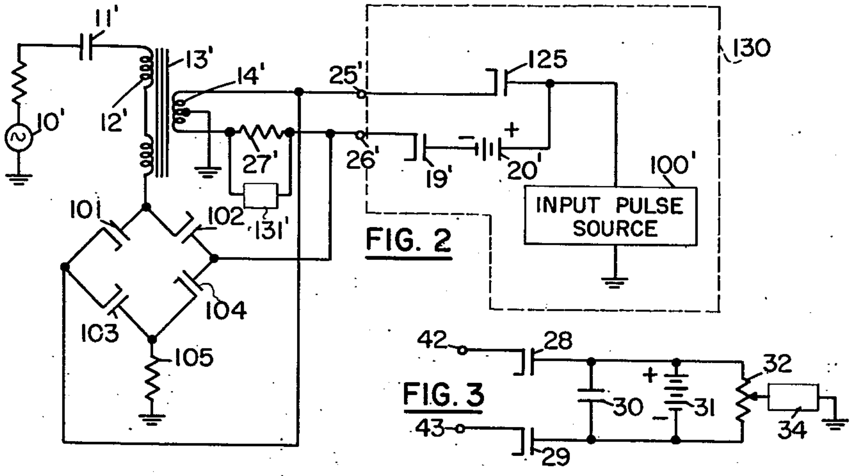
Figures 2 through 5 are schematic sketches of alternative embodiments of the invention.

Referring now to Figure 2, the circuit is generally the same as that shown in Figure 1 except that the rectifying means are different and the transformer 128 has been eliminated. Those elements of Figure 2 which correspond to the same elements of Figure 1 are represented by primed numbers which correspond to unprimed numbers of Figure 1. Those elements which do not have exact counterparts in Figure 1 have different, unprimed reference characters. For example, diodes 101, 102, 103, and 104 which have no exact counterparts in Figure 1 form the full wave bridge rectifying means of Figure 2. Resistance 105 which has a value of 100 ohms is connected from the junction of diodes 103 and 104 to ground potential. The potential source 20' has a value about two volts greater than the magnitude of the input pulse from source 100' which may typically be about positive 7 volts. This is to prevent a pulse from flowing through the diode 19' when the flip-flop circuit is in its low current condition and a pulse is generated by source 100' but is not sufficiently large to prevent current flow through the diode 19' when the flip-flop circuit is in its high current condition. Diode 125 operates to disconnect terminal 25 and prevent the flow of sneak currents from the rectifier 102. As in Figure 1, the circuitry within the dotted line box 130, in combination with the flip-flop circuit outside the box 130 together form a binary counter circuit.

Referring now to Figure 3, there is shown another embodiment of the invention illustrating the structure adapted to convert the flip-flop circuit into a binary counter. The anode of diode 29 is connected to input pulse source 34 through a first portion of tapped resistance 32. The anode of diode 28 is also connected to input pulse source 34 through a second portion of tapped resistance 32. Potential source 31 is connected across the resistance 32. No circulating current will flow from the potential source 31 through the circuit of Figure 1 extending through asymmetrical device 28, winding 14, resistance 27, asymmetrical device 29 (of Figure 3) and back to the potential source 31 due to the fact that the asymmetrical devices 29 and 28 are connected in proper polarity to prevent circulating current in the above identified circuit. Capacitance 30 is connected across center tapped resistance 32 and provides a shunting path for undesirable transient currents. It is to be noted that resistance 32 may be tapped at points other than its center. The potential source 31 is of such a value with respect to the values of the two portions of resistance 32 that the diode 29 is conductive when a positive input pulse is applied from source 34 at a time when the flip-flop circuit is in its high current state and a large voltage is developed across the resistance 27 of Figure 1 but is non-conductive when the flip-flop circuit is in its low current state and very little voltage is developed across the resistance 27.

The current from pulse source 34 can flow in two paths. One of these paths is from the pulse source 34 through the upper portion of resistance 32, the diode 28 and the upper portion of winding 14 in Figure 1 to ground. The other path is from the source 34, the lower portion of resistance 32, diode 29, resistance 27 of Figure 1, and the lower portion of winding 14 to ground.

Terminals 42 and 43 are connected to terminals 25 and 26 of Figure 1 respectively or to terminals 25' and 26' of Figure 2 respectively in lieu of the structure within the dotted line box 129 or the dotted line box 130.

In the embodiment of Figure 3, capacitance 30 has a value of 0.1 microfarad and resistance 32 has a value of 1000 ohms. Potential source 31 supplies 18 volts which will produce a negative 9 volt bias on the anode of diode 29. Pulse source 34 is adapted to generate 7 volt positive pulses.

Figure 4:
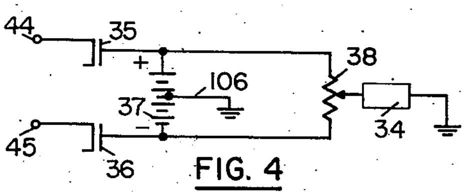

Referring now to Figure 4, there is shown another means to convert the flip-flop circuit into a binary counter device. Asymmetrical devices 35 and 36 are connected to prevent circulating current flow from the potential source 37 which has a tap at ground potential. Input pulse source 34 is connected to a tap of resistance 38, which in turn is connected across the potential source 37. A circuit for the current from potential source 37 may be traced from the positive terminal of source 37 through resistance 38 and back to the negative terminal of source 37. Thus, a negative 9 volt bias is produced on the anode of the diode 36 since the center tapped potential source 37 supplies 18 volts. A further current from the potential source 37 can be traced in a circuit extending from the positive terminal of the potential source 37 through diode 35, the upper portion of winding 14 (of Figure 1) to ground potential and then to the grounded tap 106 of the potential source 37. The current from pulse source 34 can flow in two paths. One of these paths is from the pulse source 34, through the upper portion of resistance 38, through the diode 35 of Figure 4, the upper portion of winding 14 of Figure 1 to ground. The other path, which is conductive only under certain conditions to be more fully explained later, can be traced from the pulse source 34, through the lower portion of resistance 38, asymmetrical device 36 of Figure 4, resistance 27, and the lower portion of winding 14 of Figure 1 to ground. Terminals 44 and 45 are connected to terminals 25 and 26 of Figure 1 respectively or to terminals 25' and 26' of Figure 2 respectively in lieu of the structure within the doted line box 129 or the doted line box 130.

Figure 5:
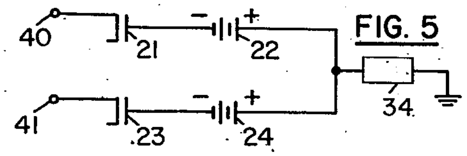

Referring now to Figure 5, diodes 21 and 23 are connected to input pulse source 34 through the upper potential source 22 and the lower potential source 24 respectively. The lower potential source 24 biases the diode 23 in such a manner that when the flip-flop circuit is in its high current condition, input pulse current will flow from input pulse source 34 through the lower biasing potential source 24, diode 23, resistance 27 of Figure 1, the lower portion of winding 14 to ground and back to the input pulse source 34. However, if the flip-flop circuit is in its low current condition, the voltage drop across the resistance 27 will not offset the bias of the lower potential source 24 so that the diode 23 will be in a cutoff condition and therefore non-conductive. Terminals 40 and 41 are connected to terminals 25 and 26 of Figure 1 respectively or to terminals 25' and 26' of Figure 2 respectively in lieu of the structure within the dotted lines 129 or 130. The current from pulse source 34 can flow in two paths. The first of these two paths is through resistance 27 of Figure 1 as indicated above. The other current from pulse source 34 extends through the upper potential source 22, diode 21, and the upper portion of winding 14 of Figure 1 to ground. The upper potential source 22 performs the function of decreasing the current through the upper portion of the winding 14 from pulse source 34. In this embodiment of the invention the upper potential source 22 has a value of about 3 volts and the lower potential source 24 has a value of approximately 9 volts. The pulse source 34 is adapted to generate positive 7 volt pulses.

It is to be noted that similar circuit paths for the pulse source 34, 29 and 33 of Figures 3, 4 and 5 may be traced with respect to Figure 2 as were traced for Figure 1. The output load circuit of all the embodiments of the invention may be connected across the resistor 27.

Figure 6:
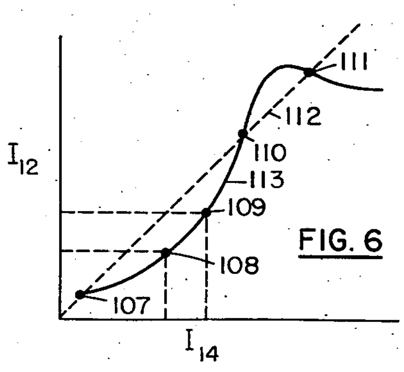
Figure 6 is a graph illustrating a typical operating characteristic curve of the circuits shown in Figures 1 through 5.
Figure 7:
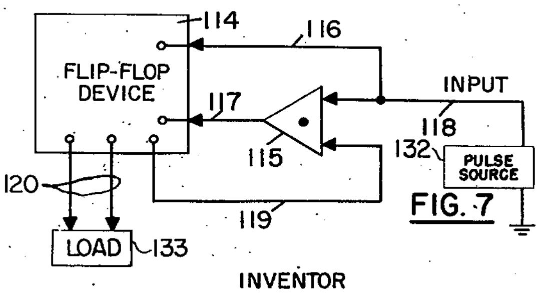
Figure 7 shows a functional block diagram illustrating the general organization of the invention.

Referring now to Figure 7, there is shown a functional block diagram sketch of the invention. The block 114 represents the flip-flop circuit and has input leads 116 and 117 and output leads 120. Output leads 120 are connected to the load circuit 133. Lead 119 is connected at one end to a point within the flip-flop circuit which is at either a high potential or a low potential depending upon which of its two bistable conditions is resident in the flip-flop circuit and may be the same as one of the input leads as in the embodiments of Figures 1 and 2. The lead 119 is connected at its other end to the first input lead of the gate circuit means represented functionally by the block 115. Input pulses are conveyed by conductor 118 to the second input lead of the gate circuit means 115 and are also conveyed by the input lead 116 to the flip-flop circuit 114. The output signals of the gating means 115 are connected to the second input lead 117 of the flip-flop circuit. When the flip-flop circuit is in a first of its two stable states, the conductor 119 will have a potential (derived from the flip-flop circuit) of such value that when an input pulse is impressed upon input conductor 118 form pulse source 132, the gating circuit means 115 will be closed and no pulse current will flow therethrough. The input pulse will flow through the conductor 116 to the first input means of the flip-flop device 114 to cause the flip-flop circuit to assume the second of its two stable states. This will open the gating network 115 so that when another pulse is applied to the input lead 118 from pulse source 132 a sufficient portion of the pulse will flow through the gating network 115 to cause the flip-flop device 114 to assume the first of its two stable states. It is to be noted that when the gating circuit means 115 is in an open or conductive condition, an input pulse applied to conductor 118 will tend to flow through the conductor 116 as well as through the gating circuit. However, the circuit parameters are such that the flip-flop circuit will have a preferred state and when the gating circuit means is conductive and an input pulse is applied to input conductor 118, the flip-flop will always assume the said preferred state caused by a pulse being transmitted through said gating circuit means 115 even though a portion of the input pulse also flows through the conductor 116. If the gating circuit is closed, the flip-flop circuit will assume the non-preferred state when an input pulse is applied to the input conductor 118. The flip-flop circuit represented by the block 114 is a type of flip-flop circuit having a characteristic curve with two stable states separated by a negative resistance region as indicated in Figure 6. The gating circuit means represented by block 115 can be any suitable type of gating means.

For operation of the circuit of Figure 1 consider that the alternating current source 10 supplies current constantly in a circuit which may be traced through the capacitor 11, the winding 12, and then in parallel through a first circuit means consisting of diode 16, resistance 27, and the lower portion of winding 14 to ground, and through a second circuit consisting of diode 15, and the upper portion of winding 14 to ground. It can be seen that the rectifiers 15 and 16 perform the function of rectifying the current to winding 14 so that the current therethrough will be unilateral and will cause a unilateral magnetic flux to be generated in the magnetic core 13. This unilateral magnetic flux will change the impedance presented to the alternating current flowing through the winding 12 compared to what said impedance would be if the unilateral flux were absent. Since the unilateral flux is created by the same current as the alternating current flowing through said winding 12 there will be a condition of instability until the current flow through the winding 14 is equal to (in a rectified condition) the alternating current flowing through winding 14 and the laws governing applied voltage, current flow, and circuit impedance are satisfied.

Reference is made to Figure 6 which shows an operating curve 113 of the flip-flop circuit wherein the ordinate designated as $I_{12}$ is the average current through the winding 12 and the abscissa designated as $I_{14}$ is the current through the winding 14. In the actual circuit shown in Figure 1, all points on curve 113, of Figure 6, other than points 107 and 111, would be unstable for reasons that will appear below. The dotted line 112 is drawn as an angle of substantially 45° from the origin and intersects the operating characteristic line 113 at three points 107, 110, and 111. The reasons for this dotted line will become more apparent later. Assume that at some point in time, the flip-flop is operating in a transient condition at point 109. It can be shown that the current through winding 12 ($I_{12}$) would have to be less than the existing current through the winding 14 ($I_{14}$) in order to produce stability. This is not possible, however, since $I_{12}$ must equal $I_{14}$. Consequently, this is not a stable condition and therefore $I_{12}$ will decrease in an effort to be equal to $I_{14}$. Point 108 represents conditions after some decrease has occurred. At this operating point 108, however, $I_{14}$ has also decreased and instability is still present. This process will continue until operating point 107 is reached where $I_{12}$ is equal to $I_{14}$. At this operating point the flip-flop circuit is stable and will operate at that point until it is changed by some external means. If the flip-flop is operating at some point above the point 110, then the operating point will shift to stable point 111. Point 110 is an unstable operating point since, if a transient signal throws the operating point to either side of the point 110, the operating point will immediately shift to operating point 107 or operating point 111 due to the negative resistance characteristic. It can be seen then that the flip-flop circuit has two stable operating points represented by a relatively high $I_{14}$ current at point 111 and a relatively low $I_{14}$ current at point 107. These two currents will produce a high voltage of about negative 6 volts and a low voltage of about zero volts respectively across resistance 27. The negative voltage (−6 volts) developed across resistance 27 is more negative than the resultant differences between the voltage developed across the secondary winding (+7 volts) and the biasing voltage 20 (−9 volts) developed across the secondary winding. The low voltage (substantially ground potential) developed across resistance 27 is less negative than the resultant difference between the voltage (+7 volts) developed across the secondary winding and the biasing voltage 20 (−9 volts). Consequently, an input pulse generated by input pulse source 100 will flow through the asymmetrical diode 19 only when said high negative voltage is present across the resistance 27.

Assume that the flip-flop circuit is operating at point 107 on curve 113 of Figure 6. This is the low current operating point so that a relatively small voltage is generated over the resistance 27. This voltage is insufficient to overcome the bias voltage 20. Consequently, diode 19 will be in a cut-off condition and when a positive input pulse is generated by input pulse source 100 no current will flow through diode 19 but will flow only through the resistance 17 and the upper portion of winding 14 to ground. This current through the upper portion of winding 14 will be of the same polarity as the rectified portion of the alternating current from source 10 flowing therethrough. The magnetic flux created in the magnetic core 13 by the total current through winding 14 will be thereby increased so that the impedance presented to the source 10 by winding 12 will be decreased to a point sufficient to permit the current flow from source 10 through winding 12 to increase above the point 110 of curve 113 of Figure 6. When this occurs the current will immediately go to stable point 111 as hereinbefore described.

Under this condition there will then be a relatively large current from source 10 through the resistance 27 so that the potential of junction 26 will be less than the potential of the anode of diode 19 when a pulse from source 100 flows through primary winding 127. Thus, when a positive input pulse is generated by input pulse source 100, a portion of the input pulse current will flow through the primary winding 127, the secondary winding 126, asymmetrical device 19, resistance 27, and the lower portion of winding 14 to ground potential. This current will oppose the current through the lower portion of winding 14 from source 10 and this will decrease the magnetic flux in magnetic core 13 so that the impedance presented to current flow from source 10 will be increased, thus decreasing the current ($I_{12}$) from source 10 through winding 12 to a point below point 110 on curve 113 of Figure 6. The operating point will then immediately go to point 107 as described hereinbefore. The portion of the input pulse current flowing through the upper portion of winding 14 will tend to cause the device to go to its high current state but since the preferred state of the device is the low current state because of action of the delay circuit comprising resistor 17 and capacitor 18, the current through the lower portion of the winding 14 will predominate. Subsequent input pulses generated from source 100 will cause the operating point of the circuit to shift alternately between points 111 and 107 which represent the two stable positions of the circuit.

Referring now to Figure 2, the operation of the circuit is essentially the same as is shown in Figure 1. There are, however, certain differences. The means for rectifying the alternating current after it leaves the primary winding 12' is different. In Figure 2 four rectifiers 101, 102, 103 and 104 are used to rectify the current in a well known manner and therefore is not described in detail here. In addition the transformer 128 has been eliminated and accordingly the input voltage for the lower portion of winding 14 is taken directly from the source 100.

Assume that the binary device is in its high current state. The junction 26' is then at a potential of approximately a negative six volts at the cathode of diode 19'. If a positive seven volt pulse is generated by the source 100 and the bias potential is negative nine volts at the anode of the diode 19' the resultant anode potential will be positive four volts. Consequently a current will flow from source 100' through the lower portion of winding 14' to ground to cause the binary device to switch to its low current state. It is to be noted that a portion of the current from source 100' also will flow through the upper portion of winding 14'. However, because the same potentials cause the cathode of diode 125 to be at about positive four volts, the low current state of the binary device is the preferred state and only the current through the lower portion of the winding 14' flows to cause switching to point 107 of the curve of Figure 6. The potential of junction 26' is now sent to approximately ground potential. If another seven volt pulse from source 100' is generated the anode of the diode 19' will be at a negative two volts and no current will flow through the diode 19'. Current will, however, flow through the upper portion of the winding 14' through the diode 125 to cause the binary device to assume its high current state since the potential at the cathode of diode 125 is effectively grounded. Subsequent input pulses from source 100' will cause the state of the binary counter to switch alternately from one stable state to the other stable state in a similar manner.

In Figure 3, the biasing voltage source 31 biases the diode 29 by means of a current flow through the resistance 32 so that an input pulse generated by source 34 will flow through the diode 29 only if the operating point of the circuit is in its high current state represented by point 111 of Figure 6. If the binary device is in its low current state the asymmetrical device 29 is biased so as to be non-conductive to an input pulse from source 34.

More specifically assume that the flip-flop circuit of Figure 1 or 2 is in its high current state. The terminal 43 of Figure 3 will be at a potential of about negative six volts and when the positive seven volt pulse is generated by source 34 the potential of the anode of diode 29 will be the difference between the positive seven volt pulse and a negative nine volt drop across the lower portion of resistance 32 which results in a negative two volt potential at the anode of diode 29. Consequently, a resultant anode potential of positive four volts will cause a current to flow through the diode 29 and the lower portion of winding 14 or 14' of Figure 1 or 2 respectively to cause the flip-flop device to assume its preferred low current state. The current flowing through the upper portion of winding 14 or 14' will have no effect for the same reasons as discussed hereinbefore with respect to Figure 2. The potential of the terminal 43 will now be substantially at ground since the flip-flop is in its low current state. Consequently, when another pulse is generated from pulse source 34 the anode of diode 29 will be at a negative two volts and no current will flow through the diode 29. Current will flow, however, through the upper portion of winding 14 or 14' of Figure 1 or 2 respectively to cause the flip-flop circuit to assume its high current state. Subsequent pulses from source 34 will cause the flip-flop device to alternately assume its two bistable states.

Referring now to Figure 4 the biasing voltage source 37 is tapped to ground by lead 106. This provides a biasing potential for diode 36 by means of a voltage drop across resistance 38 in a manner similar to that described with respect to Figure 3. The operation of the circuit of Figure 4 is essentially the same as that of the circuit of Figure 3. Similarly, the operation of the circuit of Figure 5 is similar to that of Figure 2 except that in Figure 5 the upper biasing potential source 22 has been substituted for the diode 125 and pulse delay circuitry consisting of resistance 17 and capacitor 18 of Figures 1 and 2 respectively, which serve to permit the lower part of winding 14 to predominate the upper portion of winding 14. The upper biasing source 22 functions to inhibit the current from pulse source 34 that flows through the upper portion of winding 14' (Figure 2).

It is to be noted that the forms of the invention herein shown and described are but preferred embodiments of the same and that various changes may be made in circuit constants, circuit arrangements, and other features without departing from the spirit or scope of the invention, as defined in the appended claims.

What is claimed is:

1. A magnetic binary counter comprising a magnetic core having a first winding with a first terminal and a second terminal, a second tapped winding inductively coupled to said first winding, a first resistive means having its first terminal connected to first end terminal of said second winding, a first asymmetrical device connecting the second terminal of said first winding to the second terminal of said resistive means, a second asymmetrical device connecting the said second terminal of said first winding to the second terminal of said second winding means, an alternating current source coupled to the first terminal of the first winding, a return circuit from the tap of the second winding to the alternating current source, said first asymmetrical device and said second asymmetrical device connected in such polarities to form a full wave rectifying means to pass current through the second winding to set up unidirectional magnetic flux in said core and thereby adapting the core to reside in one of two stable states representing low and high current conduction from said alternating current source; an input pulse source connected to the second terminal of said second winding means, a gating circuit connected between the said second terminal of said resistive means and the input pulse source and adapted to be in a non-conductive condition in response to pulses from the source when the magnetic binary counter is in a first of its stable states and to be in a conductive condition when the magnetic binary counter is in a second of its stable states, and means in circuit between said input pulse source and said second terminal of the second winding to cause input pulses to be less effective at the second terminal than at the gating circuit, whereby the current flow in said second winding means in response to the input pulses from said input pulse source is caused by successive input pulses to alter its magnitude to conform to either of its two stable states in accordance with the condition of said gating circuit.

2. A magnetic binary counter comprising a flip-flop circuit having two stable positions, said flip-flop circuit further having a negative resistance operating characteristic, an impedance within said flip-flop circuit, means to produce a voltage drop across said impedance which is either a high voltage or a low voltage in accordance with the resident stable state of said flip-flop circuit, said flip-flop circuit having a first input terminal and a second input terminal, a first means to produce input pulses at a single input terminal, an asymmetrical means, a biasing means, a circuit connecting said asymmetrical means and said biasing means between said first input terminal and said single input terminal, an alternative circuit connected between said second input terminal and said single input terminal, said biasing means and the voltage drop across said impedance cooperating to produce a potential drop across said asymmetrical means so that the said asymmetrical means is conductive in response to said pulses only when a particular one of said high or low voltages is present across said impedance.

3. A magnetic flip-flop circuit comprising in combination, a magnetic-storage core element, a first winding about said core, a second winding about said core having end terminals and an intermediate tap, means for passing alternating current through the first winding; means for rectifying alternate half cycles of the alternating current into two unidirectional current components, a circuit coupling the two unidirectional current components into corresponding paths respectively coupled with said end terminals, a return circuit for said means for passing alternating current connected from said tap, and an impedance device coupled in series with one unidirectional current path, whereby the current flow through said impedance device tends to reside in one of two stable states at respective high and low current flow conditions to thereby produce with a magnetic element a steady state potential indicative of the storage state of said magnetic element.

4. A circuit as defined in claim 3 including a trigger pulse source, a circuit coupling said pulse source to said end terminals to induce opposite current flow in said second winding, and gating means coupled for response to the state of said element to inhibit the current flow from said pulse source at an individual one of said end terminals to thereby produce an alternating change of the storage state of the magnetic element with successive trigger pulses.

5. A binary counter comprising in combination, a bistable state magnetic core, a trigger pulse source for changing the storage state of said core, a circuit for coupling said source to the core in two polarities to select either storage state, a gating circuit responsive to the resident storage state of said core connected to inhibit one polarity of said trigger pulse source to thereby cause the core to attain alternate storage states in response to successive input trigger pulses from said source.

References Cited in the file of this patent

UNITED STATES PATENTS

| | | |
|---|---|---|
| 2,710,928 | Whitney | June 14, 1955 |
| 2,713,674 | Schmitt | July 19, 1955 |
| 2,713,675 | Schmitt | July 19, 1955 |
| 2,729,808 | Auerbach et al. | Jan. 3, 1956 |